United States Patent Office 3,560,378
Patented Feb. 2, 1971

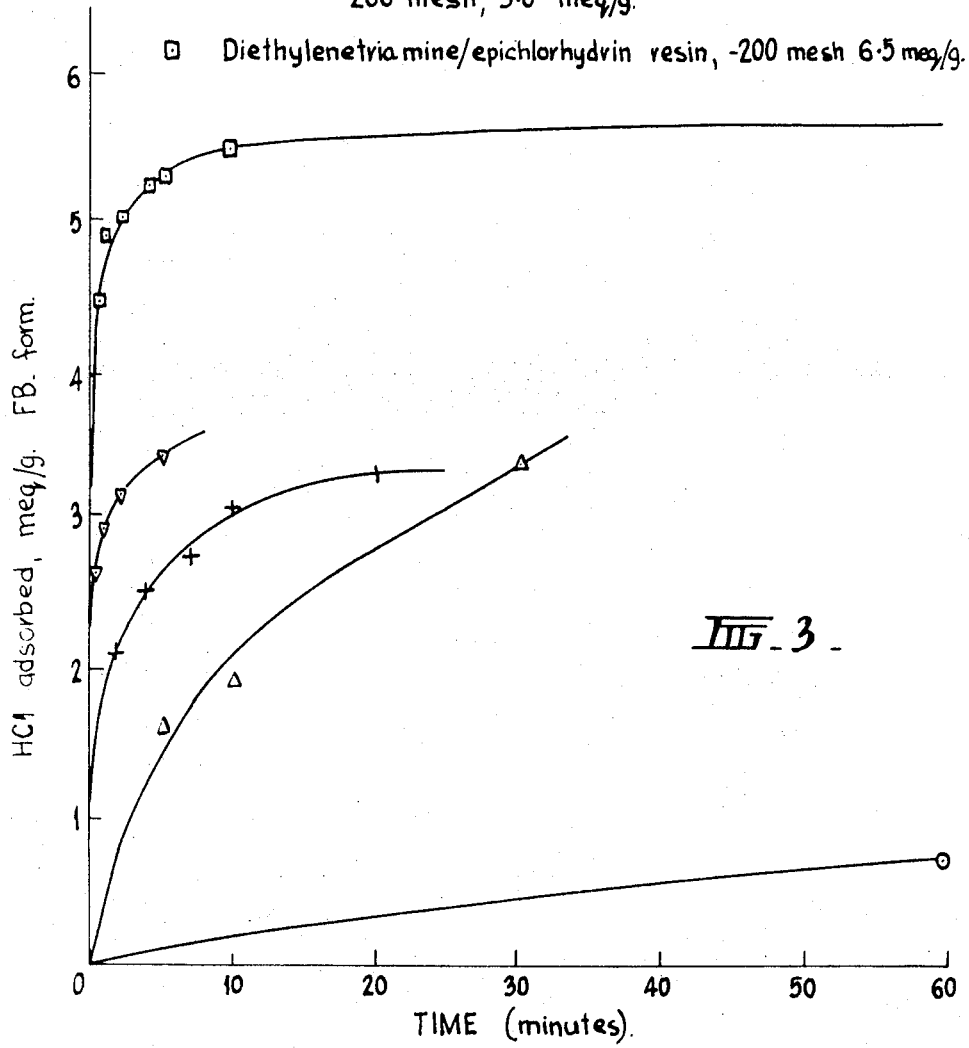

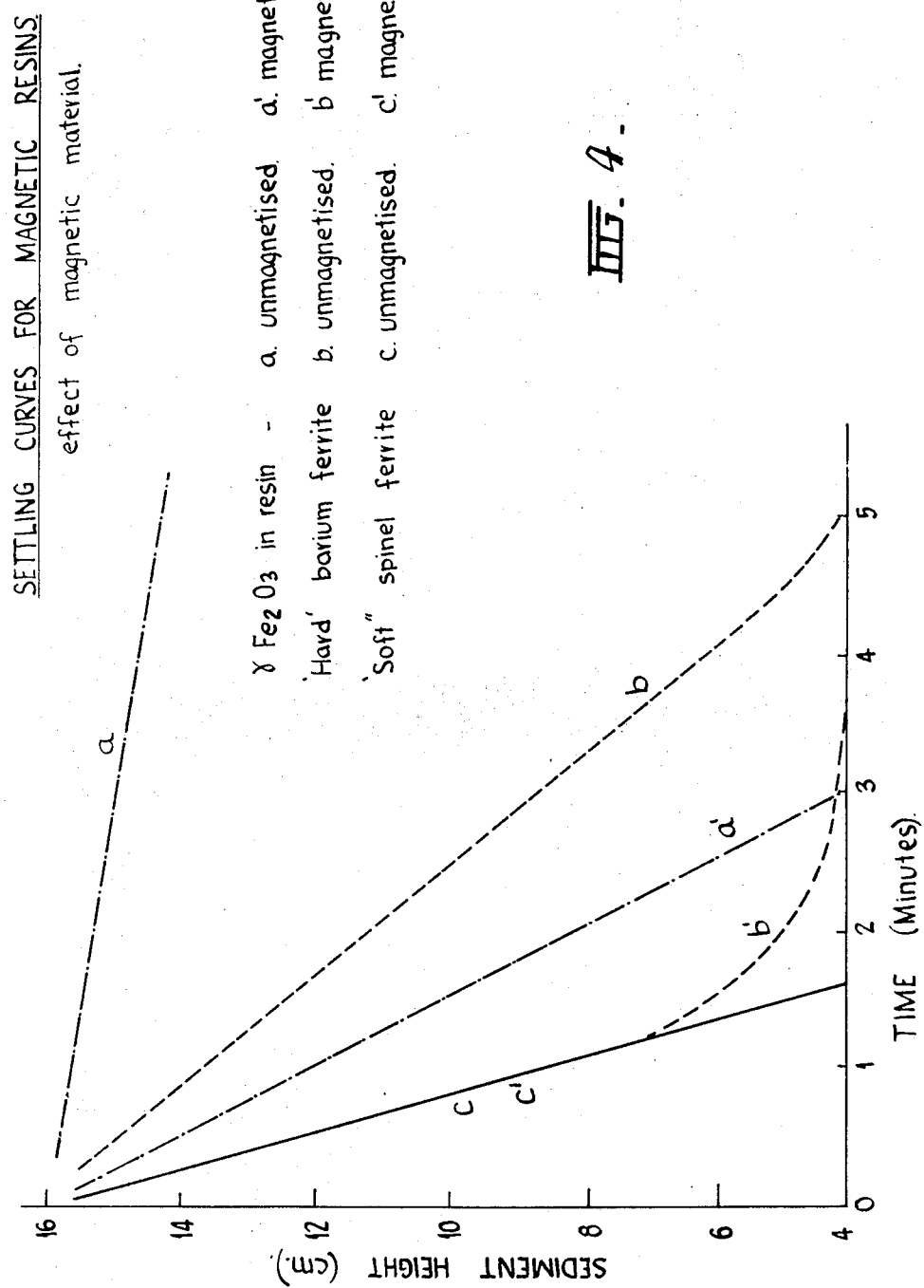

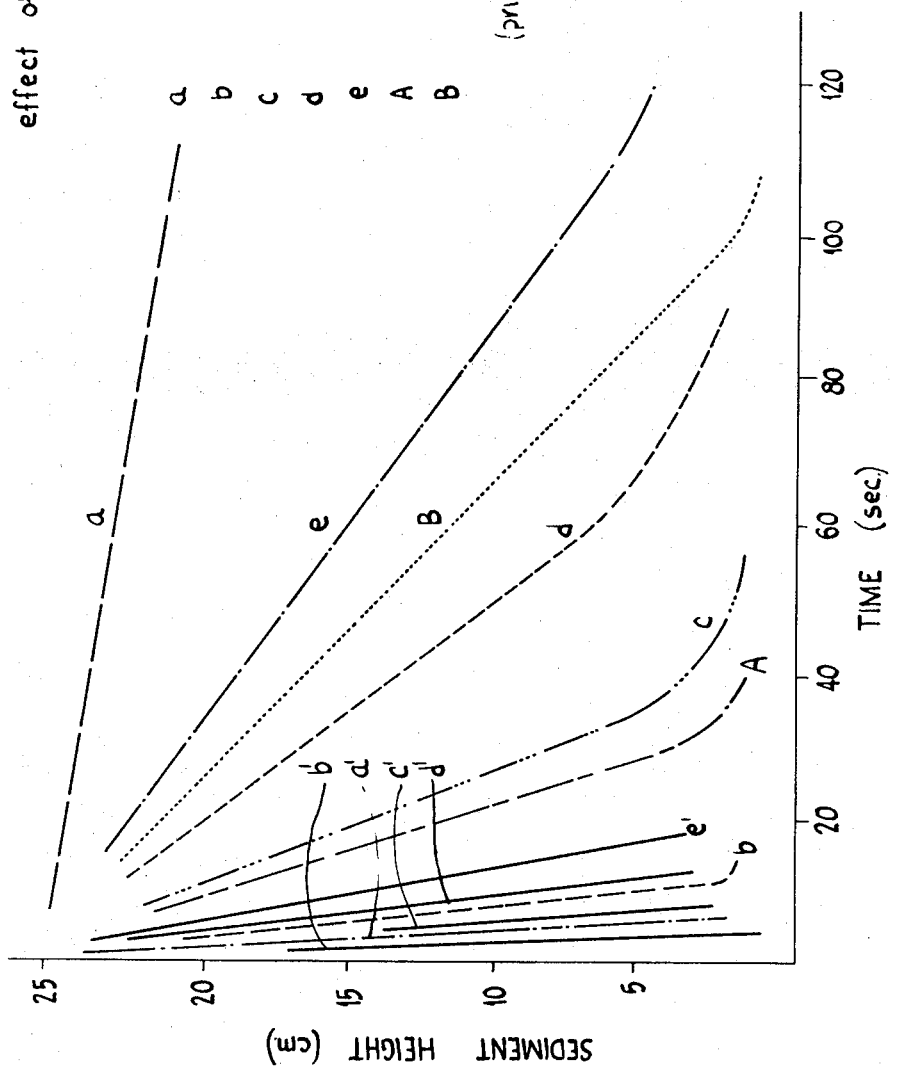

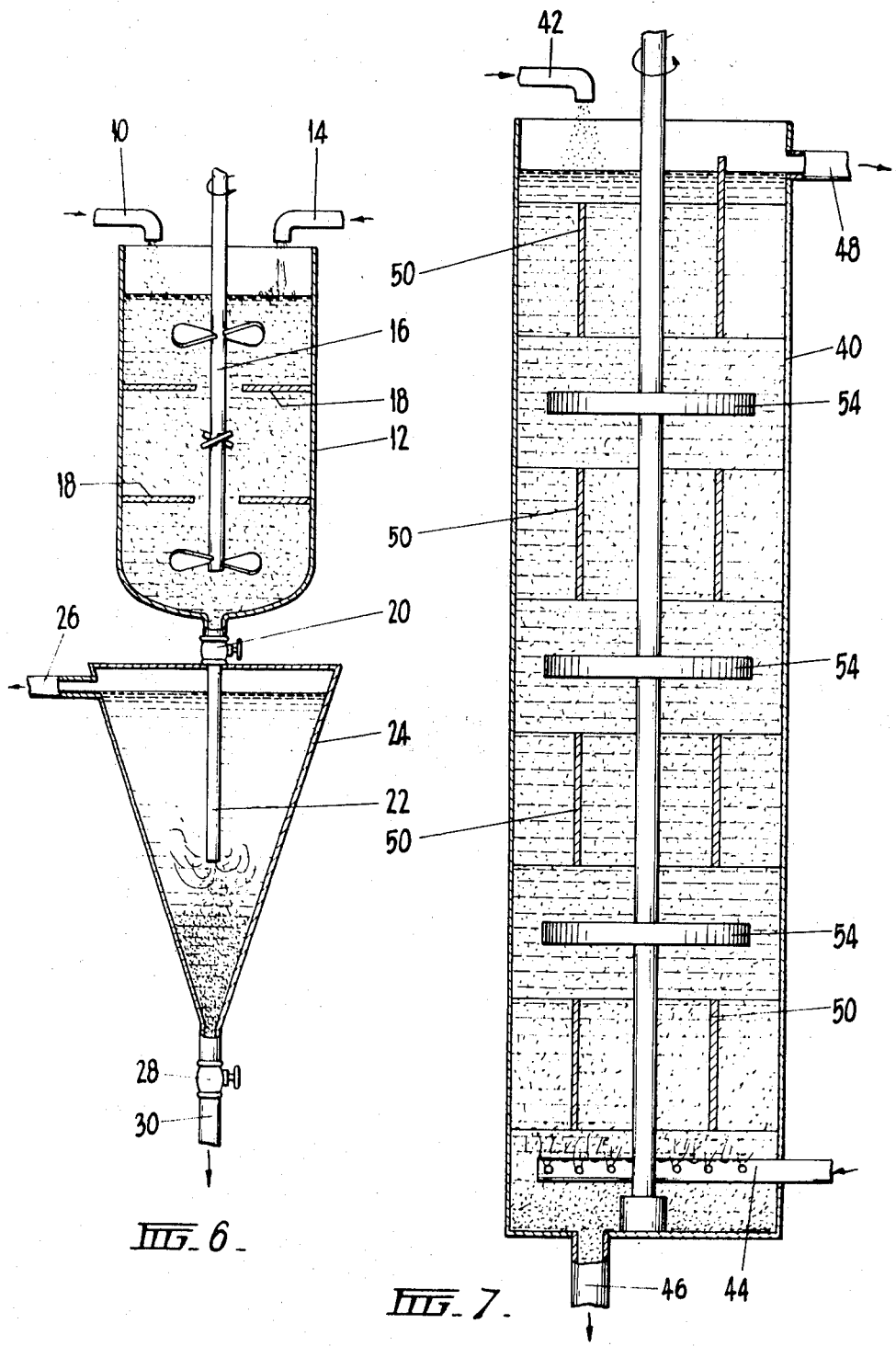

3,560,378
ION-EXCHANGE PROCESS
Donald Eric Weiss, Blackburn, Victoria, Brian Alfred Bolto, Mitcham, Victoria, Donald Willis, Blackburn, Victoria, Robert McNeill, Chelsea, Victoria, and Douglas Lyons Ford, Waverley, New South Wales, Australia; said Weiss, Bolto, Willis, and McNeill assignors to Commonwealth Scientific and Industrial Research Organization, East Melbourne, Victoria, and said Ford assignor to Union Carbide Australia Limited, Sydney, New South Wales, Australia
Filed Apr. 19, 1968, Ser. No. 722,641
Claims priority, application Australia, Apr. 20, 1967, 20,648/67
Int. Cl. B01d 15/02, 15/04
U.S. Cl. 210—36            11 Claims

ABSTRACT OF THE DISCLOSURE

An ion exchange process utilizing an ion exchange adsorbent having a particle size less than 210 microns and having ferromagnetic properties. The adsorbent, in the magnetized state, is mixed with liquid to be treated to form an agitated suspension. The adsorbent is separated from the treated liquid by allowing the same to magnetically flocculate in the absence of mixing.

---

The present invention seeks to provide a technique for increasing the efficiency of ion exchange processes, and is also concerned with the production of ion exchange adsorbents for use in such techniques.

The advantages, in terms of increased reaction rates and more effective resin usage, associated with the use of fine-particle ion exchange resins (i.e. minus 70 mesh B.S.S. which corresponds to less than 210 microns) are well known but, hitherto, the use of fine resins in commercial ion exchange processes has been precluded largely because of mechanical difficulties. For example, adsorbent beds of fine resins involve excessive pressure drops and are prone to clogging and fouling, and, backwashing to clear such beds is difficult owing to the ease with which the fine particles become entrained with the backwashing liquor. The general problem of resin loss by entrainment and fine particle elutriation is critical in some continuous ion exchange processes where, though the liquor and the adsorbents must be intimately contacted at one stage, they must otherwise be handled separately. Consequently, though very fast reaction rates and highly efficient resin utilization are theoretically available through the use of fine resin particles, commercial ion exchange systems typically employ particle sizes in the range of 30 to 50 B.S.S. (i.e. about 500 to 300 microns).

The principal object of the present invention is, therefore, to provide a technique—and resins for use therein—which will help to satisfy the obvious demand for an ion exchange process in which the kinetic advantages of a fine adsorbent can be combined with the handling advantages of a coarse adsorbent. Basically, this may be achieved, according to the present invention, by utilizing the discovery that a finely divided ferromagnetic adsorbent will, when coalesced by magnetic forces of a suitable strength and agitated in the liquid to be treated, exhibit the rates of adsorption appropriate to its actual particle size but the mechanical characteristics normally associated with larger particle sizes.

While it has been suggested (U.S. Patent No. 2,642,514) that one of the adsorbents of a fixed bed of a standard mixed bed system could include ferromagnetic particles, this was for the purpose of separating the mixed bed adsorbents following their removal from the treatment vessel. Since it is clear that proper mixing of the adsorbents in the bed during treatment cannot be achieved if one adsorbent only is magnetically coalesced the ferromagnetic adsorbent must be employed in the bed in a demagnetised state. Hence resins of standard size must be used.

Where, according to this invention, ferromagnetic material is incorporated within an ion exchange adsorbent, it is clearly desirable that the adsorbent should completely surround the material so that all of the surface area of the particle is available for use in the ion-exchange reaction. Encapsulation of the ferromagnetic material within the adsorbent is also preferable as it reduces the possibility that normal handling of the adsorbent will abrade the ferromagnetic material from the adsorbent particles. Moreover, since a body of magnetically coalesced adsorbent will normally require agitation or mixing by mechanical or hydraulic means in order to achieve the fast reaction rates made possible by the fine adsorbent, it is preferable for the adsorbent particles to be made in the form of spherical beads so as to minimize particle attrition.

Adsorbent particles having the desired characteristics are formed in accordance with the present invention by suspending a mixture of a substance, which is polymerisable or otherwise gellable to yield an ion exchange material or a precursor thereof, and a finely divided and dispersed particulate ferromagnetic material in a suspending medium which is less polar than the substance, the ferromagnetic material being completely wetted by the polymerising or gelling mass in the presence of the suspending agent, and causing or allowing the substance to polymerise or gell in small beads about particles of the ferromagnetic material. Nevertheless, it is not essential to employ composite adsorbents of this nature in the technique of this invention (though when they are employed, it is preferred to use the methods of manufacture described herein) since it has been found that a variety of ferromagnetic substances exhibit valuable ion exchange properties when they are employed as finely divided suspensions. Therefore, the techniques of the present invention are applicable to adsorbents of the latter nature as well as to the composite resin adsorbents described.

Having broadly indicated the nature of the present invention, various embodiments, alternatives and modifications will now be described by way of illustration so that the invention may be better understood. The effect of magnetic coalescence will be illustrated first, then suitable ion exchange processes utilizing this phenomena will be briefly considered and, finally, a number of examples will be given to illustrate the adsorbents and the processes for their manufacture envisaged by the present invention.

In the following description reference will be made to the accompanying drawings in which:

FIG. 3 is a graph relating HCl uptake to time for a series of fine magnetic weak-base resins and one conventional weak-base ion exchange resin.

FIG. 4 is a graph providing a comparison of the settling rates of resins incorporating different types of ferromagnetic particles.

FIG. 5 is a similar graph to that of FIG. 4 but provides a comparison of the settling rates of adsorbents incorporating different proportions of gamma iron oxide.

FIG. 6 is a diagrammatic sectional elevation of "mixer-settler" apparatus by which the process of the present invention may be practised.

FIG. 7 is a diagrammatic sectional elevation of a counter current rotating disc contactor which may also be used for the practice of the present invention.

MAGNETIC COALESCENCE AND FLOCCULATION

In this section, the rate advantages of fine adsorbents will be illustrated, then it will be shown that, under the appropriate conditions, finely divided magnetic adsorbents will behave mechanically as if they had a much larger effective particle size, and finally an example will be given to show that the high reaction kinetics of a fine magnetic adsorbent can be utilized under such conditions.

Figure 1:
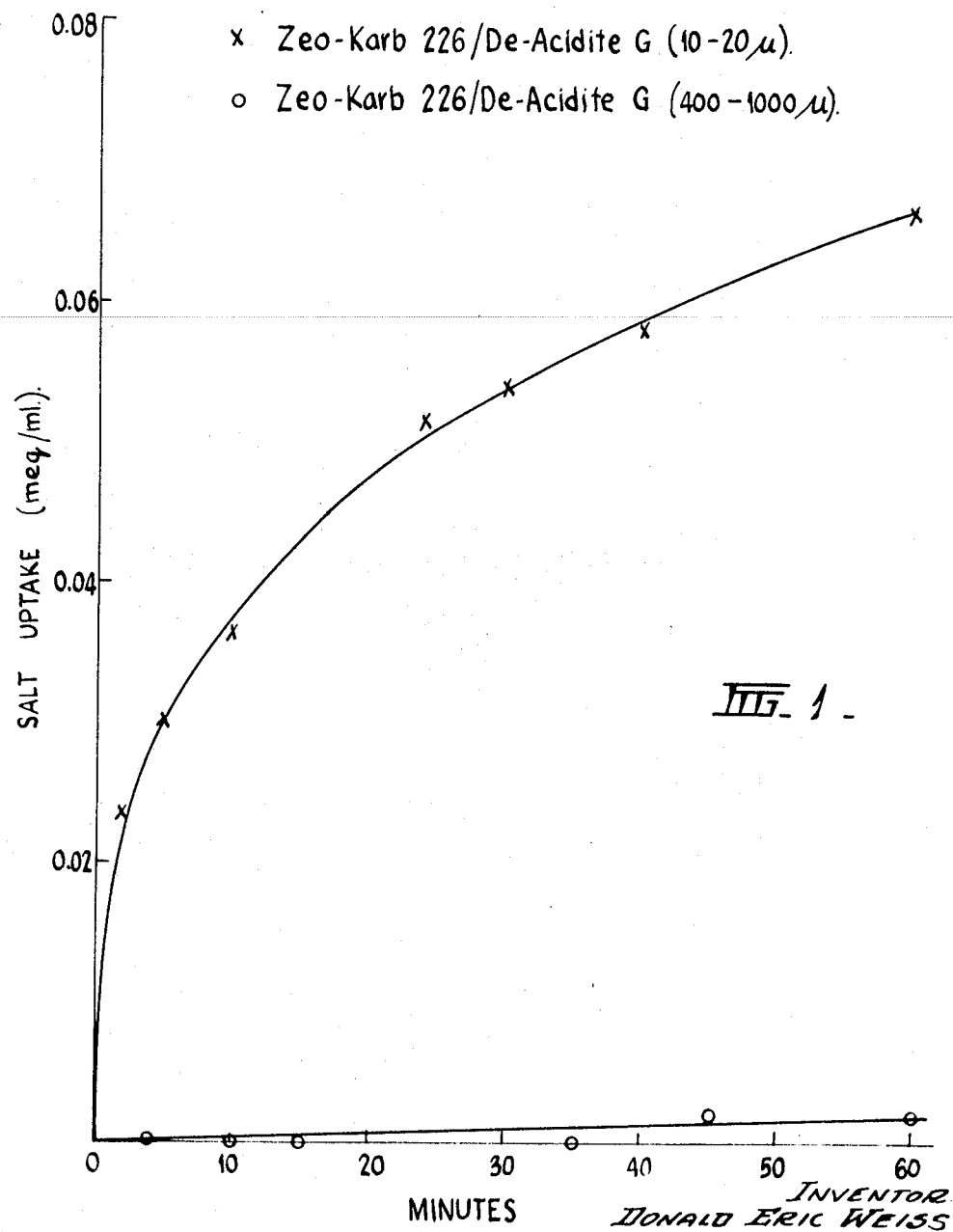
FIG. 1 is a graph relating salt uptake to time for a mixed bed of fine and coarse resins.

EXAMPLE 1.—KINETICS OF FINE AND COARSE ADSORBENTS (a) Rates of salt uptake by a mixed-bed of weak-electrolyte resins This example illustrates the advantage of using finely divided resins in the mixed-bed resin system suitable for thermal regeneration and described in a series of prior patent applications (Nos. 28,189/63 and 35,891/63 (cognate) and No. 59,441/65). The rate of adsorption of sodium chloride from an 0.03 M solution by a mixture of one equivalent of the weak-base resin with a plateau titration curve, "De-Acidite G" (registered trademark) and 2.5 equivalents of the weak-acid resin "Zeo-Karb 226" (registered trademark) (resin ratio 2.5) is shown in FIG. 1.

For comparative purposes, the resin mixture was regenerated by heating with a 1170 p.p.m. salt solution at 80° C. for 24 hours after which it was filtered from the hot solution, quickly rinsed with hot water, and then cooled. The regenerated resin mixture was then shaken with a cold 1170 p.p.m. salt solution and the rate of adsorption of the salt was measured. The 10–20 micron beads react very much faster than a standard bead fraction, 400–1000 microns, the time scale being such that the adsorption of salt by the standard beads was barely detectable after 60 minutes.

(b) Rate of NaHCO$_3$ uptake by poly(acrylic acid) resins

Figure 2:
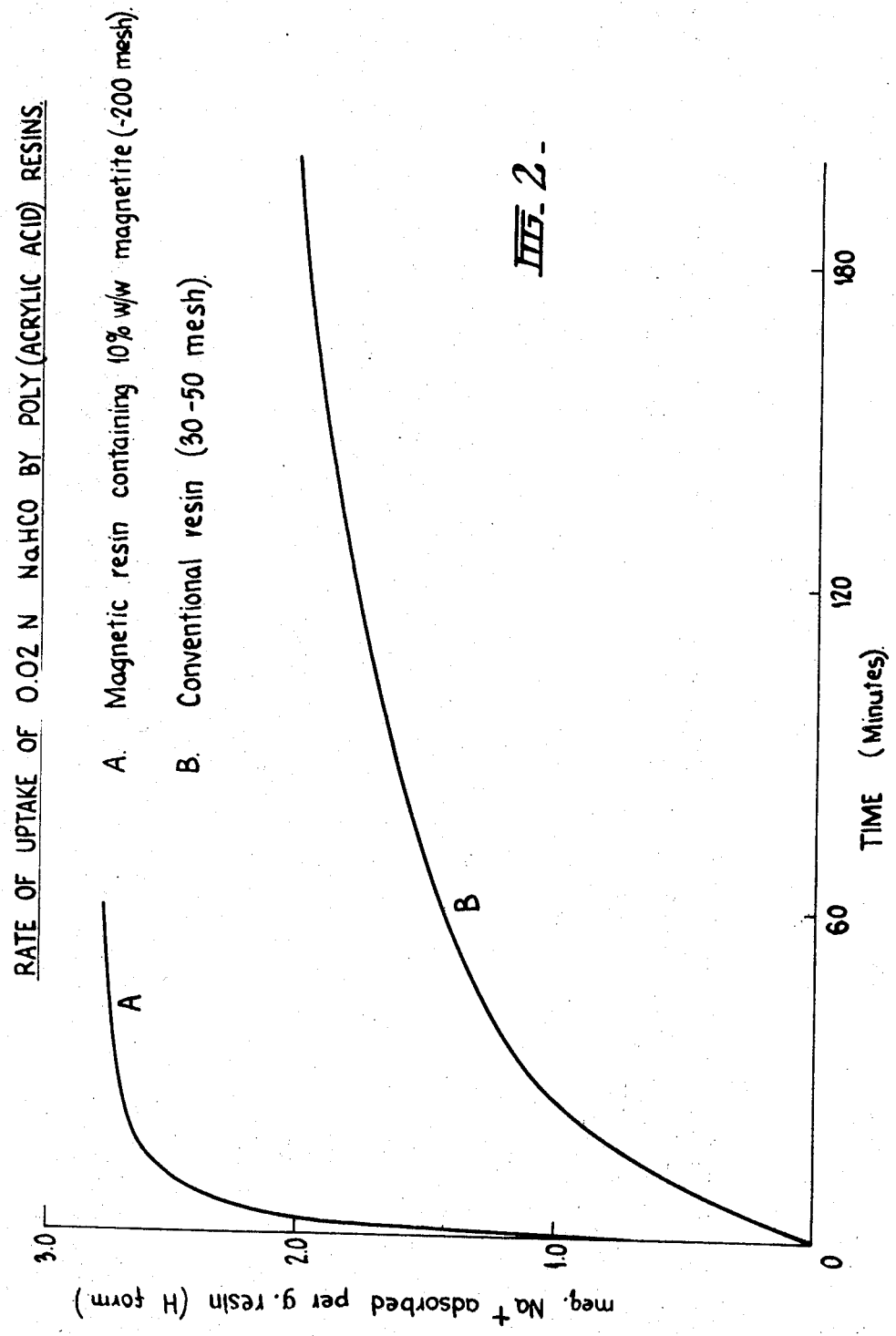
FIG. 2 is a graph relating effective Na+ uptake to time for a fine weak-acid magnetic resin and a normal weak-acid ion exchange resin.

FIG. 2 provides a comparison of the rates of uptake of a conventional (30–50 mesh i.e., about 500 to 300 microns) ion exchange resin and a fine (−200 mesh, i.e., about less than 75 microns) magnetic—but unmagnetised—resin of the same type. The ferromagnetic material employed is magnetite (10% w./w.) particles of which are encapsulated in resin beads; and it will be seen that the expected rate benefits are available to fine unmagnetised magnetic resins.

(c) Rate of HCl uptake by magnetic weak base resins

FIG. 3 provides a comparison of the performance of various fine (−200 mesh) weak base amine magnetic resins with a normal (16–18 mesh, i.e., about 1000 to 850 microns) non magnetic resin to show the effects of different resin types.

An important method of comparing the mechanical behaviour of coarse and fine adsorbents is to measure the settling rate of the sediment layer after agitation in a measuring cylinder with water. When this method is applied to magnetised and nonmagnetised adsorbents, the effects of magnetic flocculation can be clearly demonstrated as shown graphically in FIGS. 4 and 5.

The tests depicted in FIG. 4 provide a comparison of three types of magnetic material: curves (a) and (a') were obtained from polyethylenimine/epichlorhydrin resin beads of 1–80 microns and containing 20% w./w. gamma Fe$_2$O$_3$. Curves (b) and (b') were obtained from diethylenetriamine/epichlorhydrin resin particles of about 70 microns and containing 20% w./w. "Ferroxdur" (registered trademark) barium ferrite. Curves (c) and (c') were obtained from polyethyleminine/epichlorhydrin resin beads of between 1 and 100 microns containing 10% w./w. "Ferroxcube" (registered trademark) spinel ferrite. While magnetisation was induced in the gamma oxide resin by passing the resin through a field of approximately 1300 gauss, a field of 9500 gauss was employed for the ferrite resins. In each case the void water content of the settled magnetised resin was about 55 wt. percent.

The settling tests depicted in FIG. 5 provide a comparison betwen coarser polyethylenimine/epichlorhydrin resin beads containing varying amounts of gamma iron oxide. As a reference, settling curves are also shown for standard (nonmagnetic) ion exchange resins and for gamma iron oxide alone. While the most striking results are obtained with gamma iron oxide, it is though that significant improvements also can be obtained with magnetically hard ferrites though a true comparison between the magnetised and unmagnetised forms are difficult to obtain owing to the difficulty of completely demagnetising the material. Conversely, significant improvements with soft ferrites can be expected if they can be held within a magnetic field. Clearly, the degree of flocculation can be controlled by suitable choice of the nature and proportions of the magnetic material and of the strength of the magnetising field.

FIGS. 1, 2 and 3 establish the kinetic advantage to be gained by using ion exchange adsorbents in a finer state of subdivision than that of standard size adsorbents (14–50 mesh B.S.S., i.e., about 1200 to 300 microns) FIGS. 4 and 5 show that such fine particles, if ferromagnetic, can be magnetically flocculated and can then settle at rates faster than those at which the particles of a standard ion exchange resin (i.e. a resin which is free from ferromagnetic particle and has a particle size 14–50 mesh B.S.S.) settle. An example will now be given to illustrate the fact that magnetically flocculated resins have the reaction kinetics appropriate to their actual particle size.

EXAMPLE 2.—BEHAVIOUR OF MAGNETICALLY FLOCCULATED RESINS

The following experiment was performed with a magnetic trimethylol phenol N,N bis(3-amino propyl methylamine) bead resin containing 20% w./w. gamma iron oxide and having a particle size range of 30–60 mesh B.S.S., i.e., about 500 to 250 microns, 1 g. of the resin was mechanically agitated with a solution made from 100 ml. water and 50 ml. 0.0498 N HCl. The rate of reaction was measured by a conductivity method when the particles were nonmagnetized and when they had been magnetized in a field of 1000 gauss. As will be seen from Table I the rates of reaction in the two cases are similar.

TABLE I

|  | Percent attainment of equilibrium | |
|---|---|---|
|  | Magnetized | Demagnetized |
| Time, minutes: |  |  |
| 0 | 0.0 | 0.0 |
| 1 | 6.1 | 5.9 |
| 2 | 8.2 | 8.0 |
| 3 | 10.0 | 9.5 |
| 4 | 11.6 | 10.7 |
| 5 | 13.0 | 12.1 |
| 7 | 15.7 | 14.6 |
| 9 | 18.2 | 17.1 |
| 11 | 19.7 | 19.0 |
| 14 | 22.3 | 21.3 |
| 17 | 25.7 | 24.5 |
| 20 | 27.9 | 26.9 |
| 25 | 31.5 | 30.7 |
| 30 | 34.8 | 34.5 |
| 480 | 100.0 | 100.0 |

Yet, although the magnetized particles reacted at the same rate as the unmagnetized particles the settling velocity of the former was 4.5 cm./sec. compared with a value of 1.3 cm./sec. for the latter and of 0.74 cm./sec. for a standard resin ("De-Acidite FF—14–40 mesh B.B.S., i.e., about 1200 to 350 microns). Similar kinetic results are obtained with the magnetic resins described in FIGS. 2 and 3.

The above example demonstrates that, with normal stirring, magnetic flocculation will not adversely affect reaction rates. Similar demonstrations can be made without stirring where the magnetically flocculated adsorbent is used as a filter bed in a vacuum filtration process. In such a case, the filtration rates are high even though with magnetic flocculation as opposed to chemically induced flocculation—the sedimentation volume is substantially the same for flocculated and unflocculated adsorbents. Thus, magnetically flocculated fixed-bed ion exchange systems exhibit substantially the same reaction kinetics as conventional (non-stirred) fixed bed systems, although magnetic flocculation permits substantially higher backwashing rates.

ION EXCHANGE PROCESSES EMPLOYING MAGNETICALLY FLOCCULATED ADSORBENTS

While magnetic ion exchange adsorbents may be employed in a wide variety of conventional ion exchange processes, they have particular application in continuous systems which normally require coarse particles in order to facilitate mechanical handling of the adsorbents. In particular, magnetic adsorbents are valuable in simple "mixer-settler" systems employing apparatus like that shown in FIGS. 6 and 7—either in the simple form illustrated or in multistage or cascade configurations. For it is in such systems that it is particularly desirable to combine the reaction rates of fine adsorbents with the mechanical properties of coarse adsorbents.

In the system shown diagrammatically in FIG. 6, magnetised ion exchange resin particles are introduced via conduit 10 into a reaction vessel 12 together with the liquid to be treated which is introduced via inlet pipe 14. A suspension is maintained in vessel 12 by the use of a stirrer 16 and fixed baffles 18, such as to minimise short circuiting. The suspension is drained—continuously or intermittently—from vessel 12 through a control valve 20 and outlet pipe 22 into a decantation or settling vessel 24. In the absence of stirring the magnetically flocculated resin settles rapidly to the bottom of vessel 24 and clear liquid is discharged from the top of the vessel via outlet pipe 26. The accumulated resin may be removed from vessel 24 via valve 28 and pipe 30 for regeneration and remagnetisation (if necessary) prior to recirculation.

As previously indicated, another feature of magnetically induced flocs of adsorbent particles is that, under vigorous agitation, they behave mechanically according to their true particle size. Therefore, the performance of hydrocyclones is substantially unaffected by the magnetisation of such resins and satisfactory separation of resin from liquor may be achieved by the use of such hydrocyclones. Of course, since the adsorbents are magnetic, known magnetic separation techniques may be employed to advantage either alone or in combination with a hydrocyclone. In either case, the separator may be used in addition to, or in place of, the settling vessel 24 of FIG. 6.

The strength of magnetic flocculation, even with very fine resins, has been found to be such as to allow the use of such resins in multistage spinning-disc contactors of the type shown in FIG. 7; whereas, with similar conventional resins, elutriation losses would be prohibitive. Referring to FIG. 7, the magnetised resin is introduced into the top of the contacting tower via conduit 42 while the feed solution is introduced into the base of the tower through a perforated distributor pipe 44; the resin moves down the tower under gravity to exit through outlet 46, while the solution moves up the tower under a hydrostatic head to be drawn off through overflow outlet 48. Immediately upon entering the tower, the resin flocculates magnetically in the quiescent zone afforded by the fixed baffles 50 and, behaving like a coarse particle resin, falls into a mixing zone in which a rotating disc 54 effects intimate contact between the resin and the solution, thereby enabling the resin to behave chemically as a stirred fine resin. This process of coalescence and stirring is repeated in successive zones as the resin falls down the tower in order to effect progressive counter-current treatment.

THE ION EXCHANGE RESINS AND THEIR PRODUCTION

It will be seen from the foregoing that the ion exchange adsorbents with which this invention is particularly—though not exclusively—concerned are fine, substantially spherical beads of an ion exchange material within which particles of a ferromagnetic material are wholly embedded. It has been found that the production or resin beads of this nature can be best achieved by depositing—by means of gelling or polymerisation—the ion exchange material onto particles of the ferromagnetic material held in a liquid suspension.

However, and accordinging to another feature of the present invention, particular attention must be given to the wetting characteristics of the system if proper encapsulation is to be achieved. Briefly, it has been found that the particle to be encapsulated should be preferentially and completely wetted by the encapsulating monomers or partially polymerised material with respect to the suspension medium; that is, the medium should be less polar than the monomer. It is envisaged that the surface of the ferromagnetic particles can be modified, preparatory to encapsulation by the ion exchange material, in order to make them more easily wettable, to prevent reaction between them and the material or the liquor to be subsequently treated, or to assist in binding the ion exchange material to the surfaces of the particles. Additionally, surface active agents may be employed in the polymerising material or the suspending medium for similar purposes and to stabilize bead formation during the polymerisation or gelling reaction. Finally, it is preferable for the ferromagnetic material to be as finely dispersed as possible and care should be taken therefore to ensure that the ferromagnetic particles are completely demagnetised. Such modifications will be described in more detail below before giving examples of the production of particular resins.

When metal or alloys are used in highly dispersed form, it is desirable to carry out a reduction in hydrogen, followed by immersion of the particles in a deaerated solvent, before their exposure to air, in order to prevent them from becoming pyrophoric. The particles may then be treated in situ to form ion exchange resin clad ferromagnetic particles.

For some applications, e.g. those involving corrosive conditions or ion exchange groups, such as carboxyl or chelating groups, with a very high affinity for heavy metals or those involving vinyl type polymerisations sensitive to iron, it is desirable to precoat the ferromagnetic material with a thin, insoluble and water impermeable layer, such as an organic polymeric material. Such a precoat also prevents iron, for example, from entering the solution by dissolution of the ferromagnetic material during the subsequent polymerisation reaction for the deposition of the ion exchange layer; iron and other heavy metals have a deleterious influence on the initiation of radical type polymerisation. Precoating may be achieved by the vapour phase deposition of a suitable polymer, by an interfacial polymerisation technique, or by immersing the particles in a solution of a preformed polymer and stripping off the solvent. For example, a coating of poly (paraxylylene) may be achieved by heating "Paralene" (a registered trademark of Union Carbide Corporation) and permitting the vapour to polymerise at ca. 500° C. on the surface of the magnetic particles. As an example of an interfacial polymerisation technique, hydrophilic magnetic particles may be wetted with an aqueous solution of hexamethylene diamine and then suspended in a hydrocarbon. When an acid dichloride, such as sebacoyl or phthaloyl chloride, is added to the suspension, a polyamide film deposits around the particles. As an example of the solvent technique, ferromagnetic particles having a hydrophobic surface may be coated with polyisoprene, polyisobutylene or cis-polybutadiene by adding the particles to dilute solutions of the polymers in benzene or toluene. After each immersion, the solvent is removed, the procedure being repeated until a polymer layer of suitable thickness is obtained. Polymers with ion exchange properties may then be deposited around the coated particles.

Alternatively the ferromagnetic particles may be wetted with a polar polymer, such as a polyamide, dissolved in a volatile polar solvent and then suspended in a non volatile non polar solvent. Heating the dispersion whilst stirring causes the polar solvent to evaporate thus depositing a polymer film uniformly around the particles. Surfactants need to be added to control the wetting characteristics and to enable a fine dispersion to be produced. Treating the surface of the particles with a material, such as trimethylchlorosilane, to give a hydrophobic surface is also effective in minimising corrosion of the particles.

The precoating can, with advantage, be of a type facilitating chemical bonding between the subsequent ion exchange layer and the initial precoat. Thus appropriate polar groups can be incorporated within the precoat film to serve as anchoring reaction sites for ion exchange polymers resulting from a variety of subsequent polymerization reactions of the condensation type, involving the use of formaldehyde, epoxide or isocyanates. The presence of alkyl chains, vinyl groups, or double bonds, as in maleic anhydride derivatives or in rubbers, in the coating film favours grafting reactions between the film and subsequent vinyl polymerisation reactions.

It is difficult to prepare polymers in bead form with complete encapsulation of the ferromagnetic material when the monomers are water insoluble and suspended in water during polymerisation even if the surface of the ferromagnetic particles are rendered hydrophobic by a suitable treatment. This is attributed to the difficulty of completely wetting a hydrophobic surface with a monomer oil phase in the presence of water since contact angles are usually less than 180° required for complete displacement of the water by the monomer oil. As a result, polymers thus prepared are usually found to have much of the ferromagnetic material located on the surface of the bead. Whilst complete encapsulation can be achieved if the oil monomer phase is sufficiently viscous, in order to make it more difficult to be displaced by water, and if the paramagnetic particles are suitably treated to produce a hydrophobic layer then thoroughly dispersed in the monomer oil before contact with the water, such preparations are capricious and difficult to control.

However, highly satisfactory and reproducible beads with the ferromagnetic particles wholly encapsulated can be made if the monomer (or monomers) is of a polar nature and dispersed with the ferromagnetic particles, treated if necessary to ensure complete wetting of the particles by the monomer (or monomers) and the monomer mixture polymerised whilst suspended in an oil phase in which the monomer (or monomers) is substantially insoluble. Presumably in this case complete wetting of the particles by the polar phase can occur even in the presence of the oil so that there is no tendency, as in the opposite type of system, for the ferromagnetic particles to concentrate at the monomer-oil interface in order to be wetted by both phases.

The following examples illustrate the manufacture of ferromagnetic polymers of this type.

EXAMPLE 3.—PREPARATION OF MAGNETIC POLYETHYLENIMINE RESINS

A ferromagnetic anion exchange resin in bead form was prepared from linear polyethylenimine by crosslinking it with epichlorhydrine, the mixture of reactants and surface-treated magnetic particles being thoroughly dispersed in paraffin oil containing an oil soluble surfactant, prior to the carrying out of the cross linking reaction.

(i) Barium ferrite (essentially $BaFe_{12}^{III}O_{19}$) particles of ca. 1–2 micron, size were surface treated with gamma-glycidoxypropyl-trimethoxysilane by mixing 100 g. of the ferrite with 100 ml. of water, followed by 1 ml. of the silane and 5 ml. of 0.1 N sodium hydroxide. The mixture was ball-milled for 2 hrs., the ferrite filtered off, and the wet filter cake heated in an air oven at 120° C. for 30 min. The lumps of solid were added to 100 ml. of water containing 0.1% of the polyethyleneoxide surfactant NI 400 (a non-ionic surfactant manufactured by the Victorian Chemical Co. Pty. Ltd., Victoria, Australia) and the slurry ball-milled for a further 2 hrs. The wet, drained solid containing ca. 50% water was used in the ferromagnetic resin synthesis.

17 g. of polyethylenimine of molecular weight 600 was mixed with 12 ml. of hydrochloric acid and 1.5 ml. of water, the mixture being cooled in an ice-bath. 15.5 ml. of cold epichlorhydrin was added, and the mixture kept at 5–10° C. while 6.7 g. of the wet, surface-treated ferrite was intimately mixed in. The dark syrup was then transferred to 200 ml. of paraffin oil containing 2 g. of an oil soluble surfactant such as "Tween Mos 280 v.s.," (a product of Atlas Chemical Industries, Inc., U.S.A.) where it was dispersed in the form of very fine ferrite-containing droplets by rapid stirring (ca. 200 r.p.m.) with a serrated disc stirrer. The stirring was continued at 90° C. for 16 hrs. to complete the crosslinking reaction.

The product was filtered off and washed with hexane to remove adherent paraffin oil. The resin was obtained as 5–50 micron diameter spheres, which contained completely encapsulated barium ferrite. The beads had ferromagnetic properties, and did not break up or craze on wetting, which resulted in a volume increase of about 10%. Resins prepared in this manner and converted to the free base form contained a negligible amount of residual chlorine, indicating that the crosslinking reaction was carried to completion. The resins have a capacity towards 0.1 N hydrochloric acid of 6–7 meq./g. An example of their rate of acid uptake when agitated with the solution is shown in FIG. 3.

(ii) The preparation can also be carried out with polyethylenimines of molecular weight up to 1800 or with simply polyamines such as diethylenetriamine, triethylenetetramine, or tetraethylenepentamine.

(iii) The preparation of resins from polyethylenimine of molecular weight 600 and epichlorhydrin using the above conditions, but with variations of the surfactant present in the paraffin oil, is summarized in Table II. The surfactant influences the bead size of the product the location of the ferrite and the degree of clumping of the ferrite particles. The absence of prior silane treatment of the ferrite is shown to result in the ferrite being excluded from the resin beads.

methylamine. 11 g. of "Tween Mos 280 v.s." was added to 250 g. of the dispersions which was then added to 550 ml. silicone oil (cps. 1000) containing 1% of "Avibestos"

TABLE II.—EFFECT OF VARYING THE OIL PHASE SURFACTANT (1% w./w.) AND SURFACE TREATMENT OF THE BARIUM FERRITE

[Other details as in Example 3]

| Surfactant | Surface treatment of barium ferrite | Diameter of beads, microns | Location of ferrite | Nature of beads |
|---|---|---|---|---|
| S235 [a] | None | 10-80 | Bead exterior | Hydrophilic. |
| S235 (3% w./w.) | do | 10-100 | do | Hydrophobic. |
| S235 (9% w./w.) | do | 5-240 | do | Do. |
| S235 | Yes | 5-200 | Bead interior | Slightly agglomerated. |
| None | Yes | 40-400 | do | Pronounced agglomeration. |
| Brij 92 [b] | Yes | 10-400 | do | Do. |
| Brij 52 [b] | Yes | 5-400 | do | Moderately agglomerated. |
| Aerosol TR [c] | Yes | 5-400 | do | Discrete beads; ferrite clumped. |
| Span 80 [b] | Yes | 1-25 | do | Discrete beads; ferrite clumped, with none in smallest beads. |
| Span 80 [b] | Yes | 5-35 | do | Discrete beads; ferrite clumped, some in smallest beads. |
| Atpet 200 [b] | Yes | 1-40 | Bead exterior | Discrete beads; very little ferrite encapsulated. |
| Atpet G 1702 [b] | Yes | 1-80 | Bead interior | ⎫ |
| Tween Mos 280 v.s. [b] | Yes | 5-50 | do | ⎬ Discrete beads, ferrite reasonably distributed in beads of all sizes. |
| Tween Mos 100 v.s. [b] | Yes | 5-160 | do | ⎭ |

[a] A product of Glyco Products, Brooklyn, N.Y., U.S.A.
[b] A product of Atlas Chemical Industries Inc., Wilmington, Del., U.S.A.
[c] A product of American Cyanamid Company, Wayne, N.J., U.S.A.

(iv) Highly satisfactory resins containing surface treated "Ferroxcube" or gamma iron oxide were also prepared by this method. The variation of the nature of the magnetic particles has a slight effect on the bead size of the product, as shown in Table II.

TABLE III.—RESINS PREPARED WITH A VARIETY OF MAGNETIC CORES

[Other details as in (i)]

| Magnetic particles employed | Diameter of beads, microns | Distribution of magnetic particles inside beads |
|---|---|---|
| None | 10-160 | |
| Barium ferrite (nonmagnetised) | 5-50 | Reasonably uniform. |
| "Ferroxcube" | 1-160 | Do. |
| Gamma iron oxide | 1-80 | Very uniform. |
| Gamma iron oxide [a] | 1-60 | Do. |

[a] In twice the amount used in the Standard preparation.

An example of the rate of reaction of a ferromagnetic epichlorhydrin (1½ moles) diethylenetriamine (1 mole) resin contain 20 wt. percent barium ferrite obtained by agitating the resin suspended in the solution is shown in FIG. 3.

EXAMPLE 4.—PREPARATION OF TRIMETHYLOLPHENOL N,N BIS(3-AMINOPROPYL METHYLAMINE) RESIN

A trimethylol intermediate was prepared according to U.S. Pat. No. 3,109,033 (Union Carbide).

400 g. phenol were mixed with 1120 g. formaldehyde (36.3% solution) and 340 ml. of a 50% solution of sodium hydroxide was added slowly over a 35 minute period keeping the temperature between 22–29° C. When the addition was completed, the temperature was allowed to rise to 49–50° C. for 3½ hrs. The residual formaldehyde content was 2.25%. 280 g. of 75% phosphoric acid was now added with stirring over a 20 minute period. The pH was held at approximately 7, stirring was stopped and the lower layer, containing a suspension of sodium phosphate heptahydrate crystals was removed. The upper layer was placed in a refrigerator overnight, the crystalline precipitate was filtered off and water was removed by vacuum stripping at 40–45° C. After 3 hours the refraction index was 1.512. The product (T.M.P.) weighed 945 g. and contained 83% w./w. of trimethylol.

177 g. of gamma iron oxide was dispensed, using sand grinding technique and a rotating disc at 3000 p.p.m., in 225 g. of 82% T.M.P. and 145 g. of N,N 3 aminopropyl-methylamine. 11 g. of "Tween Mos 280 v.s." was added to 250 g. of the dispersions which was then added to 550 ml. silicone oil (cps. 1000) containing 1% of "Avibestos" in suspension. The mixture was stirred with a disc stirrer at 900 r.p.m. and heated to 120° C. The resin beads were separated in a centrifuge and washed first with hexane and then with ethyl acetate. After drying they were sieved. The product consisted of ferromagnetic beads of a resin with weak-base properties.

EXAMPLE 5.—PREPARATION OF NON-NUCLEAR SULPHONATED FORMALDEHYDE RESIN

A solution is prepared containing 376 g. of phenol, 124 g. of anhydrous sodium sulphate, 109.6 g. of sodium bisulphite and 818 g. of a 36.32 w./w. solution of Formalin. A strongly exothermic reaction results. When the exotherm has subsided the solution is heated to 95° C. for 1½ hrs. to yield a resin syrup A. 52.5 g. of gamma iron oxide, and 4.0 g. of acetyl pyridinium chloride are thoroughly dispersed in 350 g. of resin syrup A. The suspension is heated to 90–100° C. and then dispersed in 1000 ml. of silicone oil (1000 cps.) containing 0.6 g. of "Aerosil" by means of a high shear stirrer. The mass is heated to 100–110° C. for 1 hour. The resin beads are recovered after cooling, thinning the silicone oil with hexane and centrifuging. The beads are washed with hexane and finally with ethyl acetate dried in an oven overnight and sieved into a 70–120 mesh B.S.S. fraction. The beads possess strong acid cation exchange characteristics and are ferromagnetic.

EXAMPLE 6.—PREPARATION OF VINYL TYPE MAGNETIC RESINS

Dry, acid washed magnetite (−275 mesh, B.S.S) was surface treated with 2.5% w./w. of vinyl triethoxysilane and treated to 100° C. for 1 hour. To a slurry of 5 g. of the product in a solution of 50 g. of dimethylaminoethyl methacrylate, was added sufficient hydrochloric acid to bring the pH to a value of about 3 (by forming the amine hydrochloride) and 2.65 g. of N,N methylene bisacrylamide. To the slurry was added 0.5 of ammonium persulphate which dissolved in the aqueous phase. The mixture was then added to 200 ml. of paraffin oil containing 2 g. of an oil soluble surfactant, such as "Tween Mos 280 v.s." (a product of Atlas Chemical Industries, Inc., U.S.A.), where it was dispersed into fine magnetite—containing droplets by rapid stirring with a serrated disc stirrer. The polymerisation was carried out by heating the mixture to 60° C. for 15 hours. The black beads completely enveloped the magnetite and were washed with hexane and acetone. The magnetic resin possessed weak-base ion exhange and ferromagnetic properties, and exhibited a well developed plateau in its titratory curve.

Other ferromagnetic ion exchange beads of the vinyl type may be made by a similar procedure in which the dimethylaminoethylmethacrylate hydrochlorid monomer is replaced by other water soluble vinyl monomers such as quaternised derivatives of dimethylaminoethyl methacrylate, dimethylaminoethylmethacrylamide and its quaternised derivatives, sodium acrylate, sodium ethylene sulphonate and sodium styrene sulphonate.

EXAMPLE 7.—INTERMEDIATE COATING OF MAGNETIC RESINS

This example describes the encapsulation of magnetite with a film of nylon preparatory to the deposition of a further layer of an anion exchange resin.

10 g. of a nylon polymer "Polymid 35" (a product of the Polymer Corporation Pty. Ltd., N.S.W., Australia) was dissolved in 20 ml. of normal propanol and mixed with 0.5 g. of the Bayer gamma oxide Type S17 in a homogeniser at 16,000 r.p.m. for 10 minutes. The mixture was then added to 100 ml. of liquid paraffin containing 10 g. glycerol trioleate and stirred at 1000 r.p.m. Nitrogen was blown through the suspension as it was heated to 52° C. where it was kept for 6 hours at the end of which time all the propanol had been evolved. The product consisted of highly ferromagnetic beads, with particle sizes of 20–50 microns, in which the gamma oxide was completely encapsulated by the nylon. The thickness of the polymer film may be varied by altering the stirring conditions and the nature of the surfactant.

As a test of the completeness of the encapsulation procedure, the product was wetted with "Aerosal C 61" (a product of Cyanamid Australia Pty. Ltd.) and allowed to stand for 2 months at ambient temperature in a solution of 0.1 N hydrochloric acid. At the end of this time the solution was removed from the polymer and tested for iron with thiocyanate. Although this reagent is highly sensitive to traces of iron none could be detected. This contrasts with the behaviour of the gamma oxide, without encapsulation, in the same acid solution where an immediate yellow colouration due to dissolution of iron is apparent.

The rate of corrosion is less, but is not compeltely inhibited, when the gamma oxide has been treated with gamma glycidoxypropyltrimethoxysilane. Whilst this treatment together with the buffering action of the resin, is adequate in many situations to prevent corrosion of the oxide when encapsulated it is not adequate if strongly corrosive conditions are encountered during the production of the resin or its use, e.g. in strong acid resins in an acid cycle, or where the presence of traces of iron severely inhibits the polymerisation reaction required to make the ion exchange resin. In such circumstances the use of a fully protected ferromagnetic particle, such as the product described above, is desirable. The encapsulation technique and surface treatment may be applied to a wide variety of ferromagnetic materials so that finely divided iron and its alloys may be used as well as ferrites or magnetic iron oxides to produce ferromagnetic particles.

It will be appreciated from the foregoing that the objects and advantages of the invention have been achieved in that the use of the described adsorbents in a magnetised state enables the desired compromise between the properties of coarse and fine adsorbents to be obtained. While particular adsorbents most suitable for use in the process have been described, and while a method for their manufacture has been given, it will be appreciated by those skilled in the art that the ion exchange techniques described are applicable to ferromagnetic adsorbents other than those preferred. Such persons will also appreciate that the ferromagnetic properties of the ion exchange adsorbents can be utilized in other and conventional ways in addition to the particular technique with which the present invention is concerned. Finally, and as previously indicated, the magnetisation and demagnetisation of the adsorbent materials may be achieved by any suitable known technique and it is also intended that magnetic coalescence or flocculation of such materials in the liquid to be treated may be obtained through the residual magnetism of the material and/or by the application of an external magnetic field.

The claims defining the invention are as follows:

1. An ion exchange process for liquid treatment comprising feeding an ion exchange absorbent having a particle size of less than 210 microns and having ferromagnetic properties into a liquid to be treated and mixing the said absorbent and liquid to form an agitated suspension of the absorbent while the absorbent is in a magnetized state, allowing the particles of absorbent to flocculate magnetically in the substantial absence of mixing and separating the magnetically flocculated absorbent from the treated liquid.

2. An ion exchange process according to claim 1 wherein the absorbent to be flocculated is allowed to flocculate in the substantial absence of mixing by removing liquid and the absorbent to be flocculated from a mixing zone.

3. An ion exchange process according to claim 1 wherein the absorbent to be flocculated is allowed to flocculate in the substantial absence of mixing by discontinuing the mixing.

4. An ion exchange process according to claim 3 wherein the liquid is separated from the flocculated absorbent by decantation of the liquid.

5. A process according to claim 1 wherein there is provided a plurality of mixing and settling zones are formed in spaced relation and wherein the adsorbent and liquid pass in counter-current cascade through said zones.

6. A process according to claim 1 wherein the magnetic material is selected from the group consisting of gamma iron oxide, barium ferrite and magnetite.

7. An ion exchange process comprising the steps of: feeding liquid to be treated upwardly through a mixing zone within a reaction vessel from a lower settling zone; feeding a particulate ion exchange absorbent having ferromagnetic properties and being in the magnetized state downwardly through said mixing zone from an upper settling zone; agitating the liquid and absorbent within the mixing zone to accelerate the ion exchange reaction; passing absorbent to said lower settling zone and magnetically flocculating the absorbent particles and allowing the flocculated absorbent particles to settle out of the liquid associated therewith in said lower settling zone; and withdrawing treated liquid from said upper settling zone.

8. A process according to claim 1 wherein the absorbent is substantially spherical beads of a cross-linked organic polymeric substance having ion exchange properties and containing particles of a ferromagnetic material wholly encapsulated therein.

9. A process according to claim 2 wherein the polymeric substance comprises a polymer containing functional groups selected from the groups consisting of sulphonic, phosphoric, phosphonic, phosphinic, carboxyl, sulphydryl, phenolic, amino, substituted amino, quaternary ammonium and sulphonium groups.

10. A process according to claim 3 wherein the polymer is selected from the group consisting of poly (vinylbenzylamines), poly (vinylbenzylalkylamines), poly (alkylaminoethyl methacrylates), poly (alkylaminoethyl acrylamides), and quaternary alkylhydroxy derivatives of anyone thereof, poly (acrylic acids), poly (methacrylic acids), poly (styrene benzene sulphonates), poly (ethylene sulphonates) and anion and cation exchange and chelating polymers of the condensation type.

11. A process according to claim 2 wherein the material of the ferromagnetic particles is separated from the polymeric substance by an intermediate coating formed about said particles.

References Cited

UNITED STATES PATENTS

| | | | |
|---|---|---|---|
| 2,642,514 | 6/1953 | Herkenhoff | 210—30 |
| 2,697,724 | 12/1954 | Collier | 210—33X |
| 3,207,577 | 9/1965 | Mizuma | 210—33X |
| 3,215,624 | 11/1965 | Frazer et al. | 210—33 |
| 3,477,948 | 11/1969 | Inoue | 210—223X |

SAMIH N. ZAHARNA, Primary Examiner

U.S. Cl. X.R.

210—33, 37, 38